Oct. 7, 1941.    O. JABELMANN    2,258,572
ARTICULATED LOCOMOTIVE
Filed July 12, 1940    2 Sheets-Sheet 1
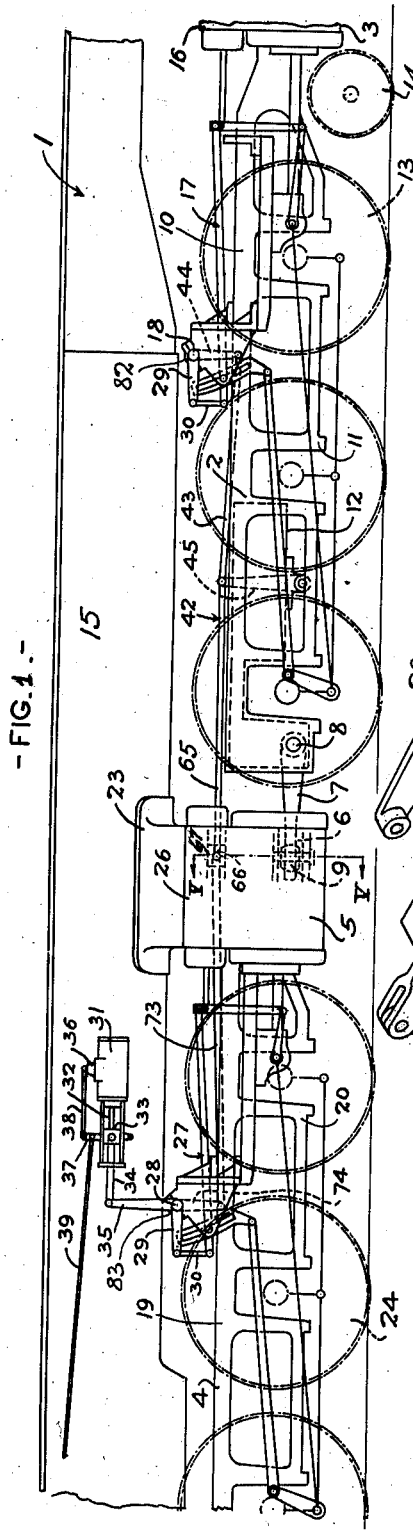
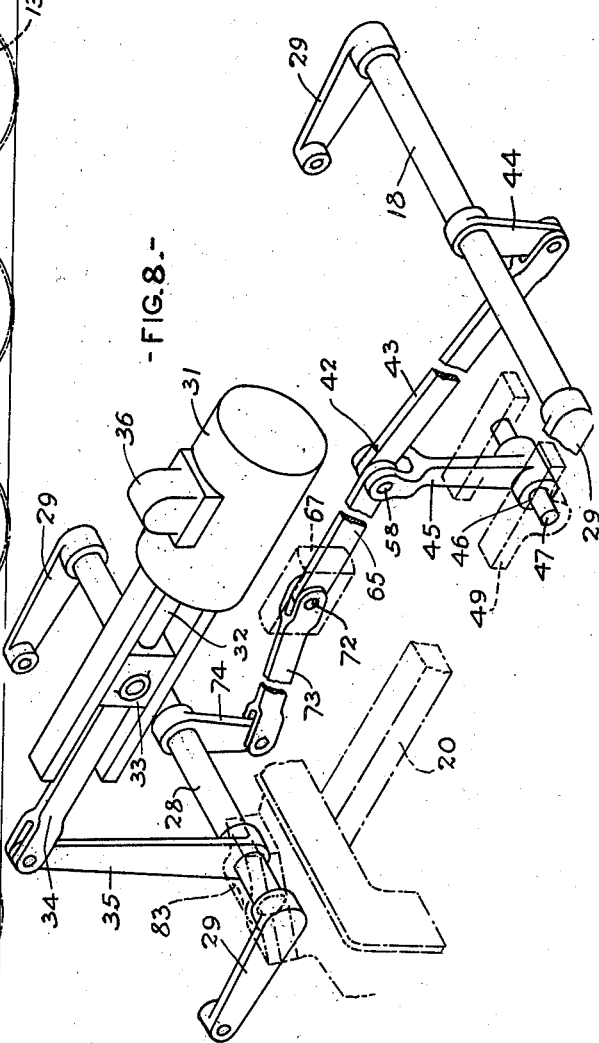
INVENTOR
Otto Jabelmann
By S. C. Yeatar
ATTORNEY Oct. 7, 1941.    O. JABELMANN    2,258,572
ARTICULATED LOCOMOTIVE
Filed July 12, 1940    2 Sheets-Sheet 2
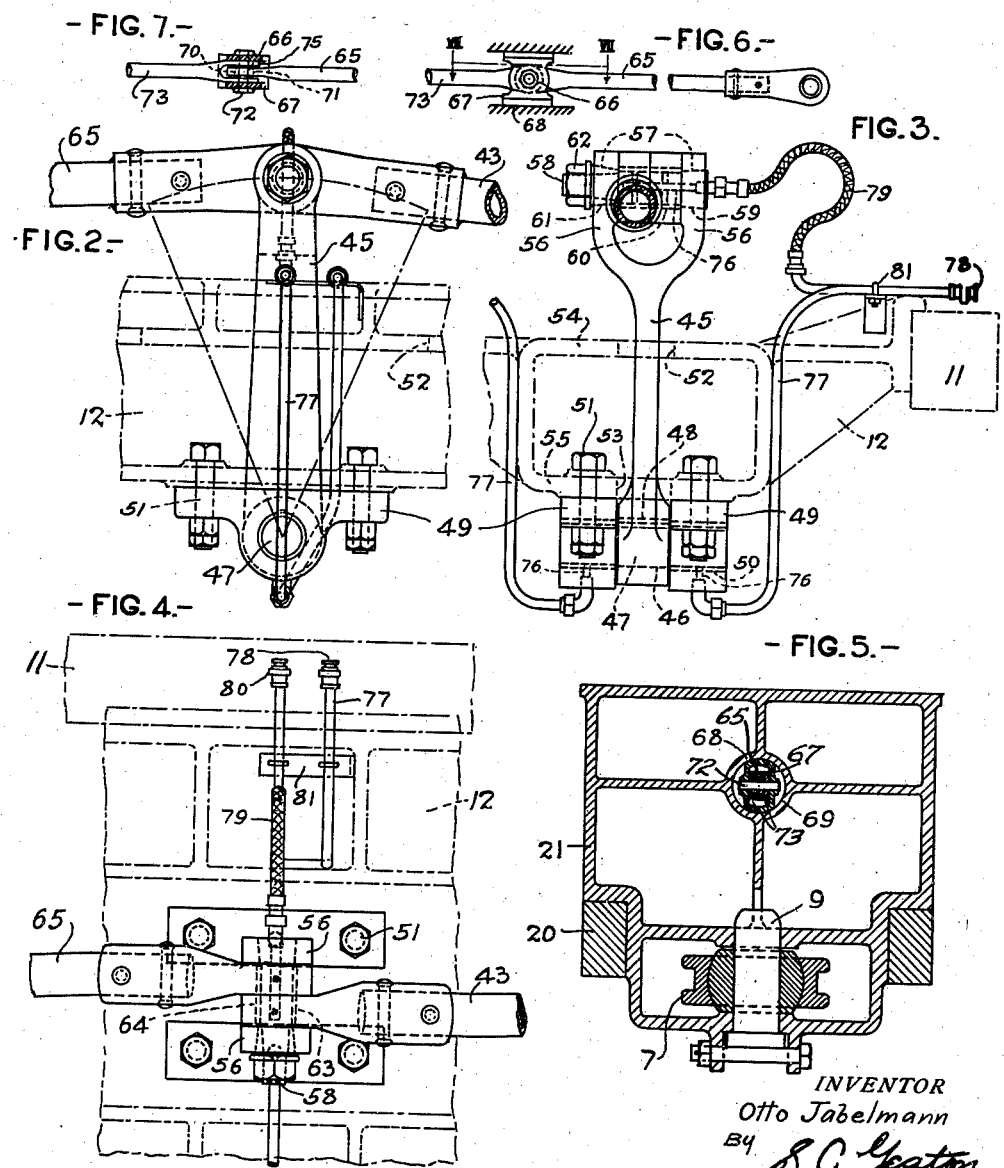
INVENTOR
Otto Jabelmann
BY
S. C. Geaton
ATTORNEY Patented Oct. 7, 1941

2,258,572

UNITED STATES PATENT OFFICE 2,258,572

ARTICULATED LOCOMOTIVE

Otto Jabelmann, Omaha, Nebr., assignor to American Locomotive Company, New York, N. Y., a corporation of New York Application July 12, 1940, Serial No. 345,028

1 Claim. (Cl. 105—48)

This invention relates to articulated locomotives and more particularly to power reverse gear mechanism reach rods therefor.

The invention is especially adapted for an articulated locomotive having forward and rear power truck units and a single reverse gear mechanism for controlling the valve gears of both units, wherein the reach rod for the control of the forward valve gears through rotation of the forward reverse shaft is itself operated through rotation of the rear reverse shaft, the reach rod being operatively connected to these two shafts. This reach rod is subject to vibrations, mostly vertical, and even if made in two sections, which is conventional, the forward section is necessarily long and is therefore subject to aggravated vibrations which distort the valve events of the valve gears of the forward and rear power truck units relative to each other. An object of the invention is to relieve this reach rod of these vibrations.

Other and further objects of and advantages achieved by the present invention will be apparent from the following description of an approved embodiment thereof and the claim appended hereto.

Referring to the drawings forming a part of this application, Figure 1 is a diagrammatic fragmental side elevation of a locomotive embodying the present invention; Fig. 2 is an enlarged fragmental side view of a portion of the locomotive of Fig. 1 showing an exemplification of the present invention, associated with a transverse member of the forward truck unit frame, which is shown fragmentally in dot and dash lines; Fig. 3 is an end view taken from the right of Fig. 2, a truck frame side member being indicated in dot and dash lines; Fig. 4 is a plan of the structure shown in Fig. 3; Fig. 5 is an enlarged fragmental section on the line V—V of Fig. 1; Fig. 6 is an enlarged side elevation of the crosshead support for the articulation joining the forward end of the rear reach rod section and the rear end of the intermediate reach rod section, a portion of the frame forming the crosshead guides being indicated in section, the rod sections joined being shown fragmentally; and Fig. 7 is a section on the line VII—VII of Fig. 6; and Fig. 8 is an enlarged diagrammatic isometric view of the power reverse gear mechanism, certain parts being shown in dot and dash lines and certain parts being broken.

The locomotive, indicated generally by the reference numeral 1, insofar as it follows conventional structure, will be described briefly. It is of the Mallet type, having a forward power truck unit 2 including two power cylinders 3, and a rear power truck unit 4 including two power cylinders 5, the units being articulated by a connecting link 6. While the cylinders on one side of the locomotive are shown in Fig. 1, it will be understood that both sides of the locomotive are similar in the usual manner.

The link 6 includes a horizontal bar member 7 which is pivotally connected to the rear end of the forward truck unit by a horizontal transverse pin 8 and is pivotally connected to the forward end of the rear truck unit for universal movement by the usual ball and pin connection 9. Thus the forward truck unit is adapted to swing horizontally and vertically relative to the rear truck unit due to track curvature or irregularities, as the case may be.

The forward truck unit includes a frame 10 formed of two side members 11 and a transverse member 12, in the rear end portion of which are formed orifices for the pin 8. The transverse member 12 extends from the rear of the forward unit part way to the forward cylinders but it will be understood that the member may extend to the forward cylinders in the usual manner if desired. The frame is supported on driving wheels 13 and a leading truck 14, and supports the front end of the boiler 15.

A valve chest 16 is mounted on top of each cylinder 3 and there is a separate distribution valve gear, indicated generally by the reference numeral 17, for controlling the events of the valve in each chest 16. The valve gears 17 are adjusted by a common reverse shaft 18. The shaft 18 is mounted in blocks 82 secured on the tops of the side members 11, being disposed transversely of the locomotive and extending from side to side thereof.

The rear truck unit includes a frame 19 formed of two side members 20 connected at their forward ends by a transverse member 21 (Fig. 5) and at their rear ends by the usual cradle (not shown). The transverse member 21 contains orifices for the pin of connection 9, indicated in Fig. 1 but shown more fully in Fig. 5. A boiler saddle 23 (shown in Fig. 1, but not in Fig. 5) supports the boiler at its approximate center on the member 21, and the cylinders 5 are carried by the member 21, to the side walls of which they are fastened by any suitable means such as bolts (not shown). The frame 19 is supported on driving wheels 24 and the usual trailing truck (not shown).

A valve chest 26 is mounted on top of each cylinder 5 and there is a separate distribution valve gear, indicated generally by the reference numeral 27, for controlling the events of the valve in each chest 26. The valve gears 27 are adjusted by a common reverse shaft 28. The shaft 28 is mounted in blocks 83 secured on the tops of the side members 20, being disposed transversely of the locomotive and extending from side to side thereof.

The valve gears are similar and are of the Walschaert type, although other types may be substituted. The reverse shafts 18 and 28 are connected to their respective valve gears for control thereof in the usual manner, through their respective arms 29 and lifting links 30.

The reverse shafts 18 and 28 are rotated by means of a power reverse gear cylinder 31 which is mounted on one side of the boiler, right side in the present instance, to the rear of the rear power cylinders 5, although it will be understood that this position is chosen merely for convenience, and any other suitable position may be employed if desired. This one reverse gear cylinder adjusts the four valve gears of the locomotive. A piston (not shown) is disposed in the cylinder and is connected by a piston rod 32 to a crosshead 33 which is connected by a reach rod 34 to a vertical arm 35 fixedly secured to the reverse shaft 28 for rotation thereof by the piston.

The piston of the reverse cylinder 31 is operated by a control valve 36 mounted on top of the cylinder 31. Valve 36 is pivotally connected by a floating lever 37 and floating lever rod 38 to the crosshead 33. A reach rod 39 is pivotally connected at its forward end to the floating lever 37 and at its rear end to a reverse gear operating lever, neither of which is shown disposed in the locomotive cab, neither of which is shown.

The foregoing description has been of a conventional articulated locomotive and further description thereof is therefore not deemed necessary. In such a locomotive, it has been the practice to connect the reverse shaft 28 to the reverse shaft 18 by means of a reach rod so that rotation of the shaft 28 is imparted, by longitudinal movement of the reach rod, to the shaft 18, the four valve gears thereby being controlled by a single reverse gear cylinder. A conventional type of reach rod is formed in two sections articulated at the forward end of the rear power truck unit, the forward rod section being thereby made necessarily long on account of the advanced position of the forward reverse shaft, all as will more fully presently appear.

The reach rod of the present invention, indicated generally by the reference numeral 42, is disposed similar to the conventional reach rod longitudinally beneath the boiler and centrally thereof. The rod includes a forward section 43, pivotally connected at its forward end to a reverse shaft arm 44 depending from the center of the reverse shaft 18. The arm 44 is fixedly secured at its upper end to the reverse shaft to rotate same when the arm 44 is swung by the rod 42. At its rear end the forward section 43 is supported by a reach rod supporting arm 45. This arm forms an important part of the present invention.

The supporting arm 45 is disposed normally vertical and is provided at its lower end with an orifice 46 through which extends a shaft 47 which is fixedly connected to the arm 45 by a key 48 (Fig. 3). The shaft 47 extends transversely of the locomotive and is mounted at either end in a bearing 49. The bearings 49 contain bushings 50 and are bolted, by bolts 51, to the underside of the transverse frame member 12 at a point intermediate the rear and intermediate driving axles of the forward truck unit. The arm extends upwardly from the bearings 49 through the center of the transverse member 12 through slots 52 and 53 formed respectively in the upper and lower walls 54 and 55 of the member 12, the member being of hollow box-shape construction. The slot 52 is elongated to permit swinging of the arm 45 about the axis of the shaft 47.

The upper end of the arm 45 is forked (Figs. 2 to 4), each branch 56 of the fork having a conical or tapered orifice 57, oppositely directed to each other, in which is secured a supporting pin 58 which extends transversely of the locomotive. The pin has a tapered head 59 disposed in one conical orifice, and a cylindrical body portion 60 extending through the space between the branches 56. The other end of the pin extends through the orifice 57 in the other branch 56, is tapered in the opposite direction to the taper of the orifice 57 through which it extends, and is of reduced size to provide a space for a conical thimble 61, which is mounted on this end of the pin to support it in its orifice 57, the orifices in the branches being similar so that the arm 45 is reversible. A nut 62, threaded on the extended end of the pin secures the bolt and the arm 45 together.

An orifice 63 is formed in the rear end of the forward section 43 and a bushing 64 is disposed in the orifice. This bushing 64 is mounted on the pin 58 in the space between the branches, thereby supporting the rear end of the forward section on the arm 45. The rear end of the forward section is about half the width of the space between the branches 56, thus leaving a space for the end of another section.

The reach rod 42 further includes an intermediate rod section 65. The forward end of this section is constructed similarly to the rear end of the forward section and is mounted on the pin 58 in the space provided therefor as aforementioned.

The intermediate rod section 65 is connected at its rear end by a universal joint 66 (Figs. 5 to 7) to a supporting crosshead 67. This crosshead slides in guides 68 formed by a cylinder 69 cast in the transverse member 21 and forming part of the rear power truck frame. The crosshead guides 68 are provided by the upper and lower inner face portions of the cylinder 69 and the crosshead at top and bottom is correspondingly arcuate to provide flexibility thereof in its longitudinal movement to and fro. The universal joint may be of any desired construction, and in the present instance, for the purposes of illustration, it is shown as formed of an orifice 70 in the rear end of the intermediate section, an orificed ball 71 disposed therein, and a pin 72 passed through the ball orifice transversely of the locomotive, the pin having its ends supported by the side walls of the crosshead 67.

The reach rod further includes a rear rod section 73. This section is connected at its forward end to the crosshead 67 in the usual manner as will presently appear, and at its rear end to the lower end of a reverse shaft arm 74 similar to the arm 44, the arm 74 being fixedly secured to the reverse shaft 28 for swinging of the arm thereby. The forward end of the rear section 73 is forked, and each fork branch 75 is supported on the pin 72, the rear end of the intermediate section fitting between the branches 75. The space between the branches 75 is sufficiently wide to allow the universal movement of the rear end of the intermediate section.

The crosshead 67 is preferably, as shown, disposed in vertical alignment with the axis of the pin of connection 9 to permit proper functioning of the reach rod during the various relative movements between the power truck units, although it will be understood that due to the setting of the valve gears by the reach rod, this point of the reach rod (crosshead) will move either to the right or left (as viewed in Fig. 1) as the case may be.

In the present exemplification of the invention, lubrication of the pin 58 and shaft 47 is provided for, as shown in Figs. 2-4. Suitable passageways 76 are provided leading to the faces to be lubricated, as shown, and the lubrication is supplied in the case of the shaft 47 through pipes 77 having at their free ends a grease fitting 78, and in the case of the pin 58 a flexible pipe 79 similarly provided at its free end with a grease fitting 80. The pipe 79 and the adjacent pipe 77 are fixed to the transverse member 12 by yoke and bracket means 81, and the other pipe 77 is secured at the opposite side of the transverse member 12 in a similar manner.

In conventional reach rods, vertical vibratory movement occurs at the point where the instant reach rod is supported by the arm 45. It will be obvious that the possibility of this vertical vibratory movement has, by employment of the arm 45, been eliminated, as the arm 45 prevents upward movement of the reach rod and holds it in a fixed position relative to the locomotive frame except when moved by the reverse gear cylinder 31, and this has been accomplished by a simple apparatus not imposing additional work upon the reverse gear cylinder.

Furthermore by forming the forward conventional rod section into two sections, strength and rigidity is enhanced enabling a lighter rod to be employed if desired, and by supporting the articulation at the adjacent ends of the forward and intermediate sections to prevent vertical vibration of the rod at this articulation in the manner aforedescribed, any buckling of the rod at this location, when the rod is placed under compression during an adjustment thereof or while under service conditions, is eliminated.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claim are contemplated as a part of this invention.

The invention claimed and desired to be secured by Letters Patent is:

In a power reverse gear mechanism for an articulated steam locomotive of the two power truck type, two valve gear control parallel transverse rotatable reverse shafts, one for each truck; bearings for the ends of said shafts; an arm secured on each said shaft; a crosshead; a guide therefor; a rod-supporting swingable arm; bearings therefor, said crosshead and said supporting arm being between said shaft arms and spaced therefrom and from each other; and a tri-sectional rod pivotally secured at its ends to said shaft arms, an outer section and the adjacent end of the intermediate section of said rod being pivotally secured to said crosshead, and the other outer section and the other end of said intermediate section being pivotally secured to said supporting arm, said shaft arms, crosshead, supporting arm and rod sections being disposed substantially in a vertical plane at right angles to said shafts and between said shaft bearings.

OTTO JABELMANN.